United States Patent [19]
Moertel

[11] 3,928,098
[45] Dec. 23, 1975

[54] METHOD OF MANUFACTURING THREADLESS SLIDE FASTENER CHAINS

[75] Inventor: George B. Moertel, Conneautville, Pa.

[73] Assignee: Textron, Inc., Providence, R.I.

[22] Filed: Aug. 21, 1974

[21] Appl. No.: 499,230

Related U.S. Application Data

[60] Division of Ser. No. 225,146, Feb. 10, 1972, Pat. No. 3,885,274, which is a continuation-in-part of Ser. No. 64,487, Aug. 17, 1970, abandoned.

[52] U.S. Cl............ 156/73.4; 24/205.16 R; 156/66; 156/201
[51] Int. Cl.[2].......................................... B32B 31/20
[58] Field of Search............ 156/66, 73.4, 293, 201, 156/199; 24/205.16 C, 205.16 R

[56] References Cited
UNITED STATES PATENTS

| 3,103,728 | 9/1963 | Wahl............................... 156/66 |
| 3,752,718 | 8/1973 | Potin............................... 156/66 |
| 3,836,413 | 9/1974 | Frohlich et al. ................ 156/66 |

*Primary Examiner*—Edward G. Whitby

[57] ABSTRACT

Slide fastener chains having a filamentary stringer with a plurality of head elements interconnected to a plurality of generally U-shaped heel members are formed by disposing stringers along a longitudinal edge of carrier tapes with the heel members threadlessly bonded with the carrier tape so that the filamentary stringers are firmly attached thereto.

8 Claims, 6 Drawing Figures

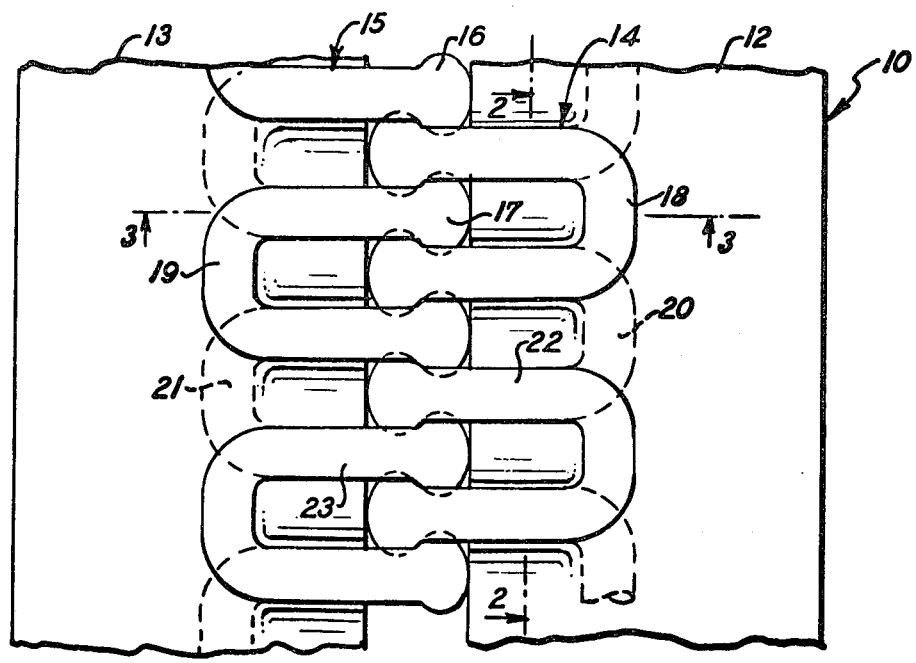
Fig.1
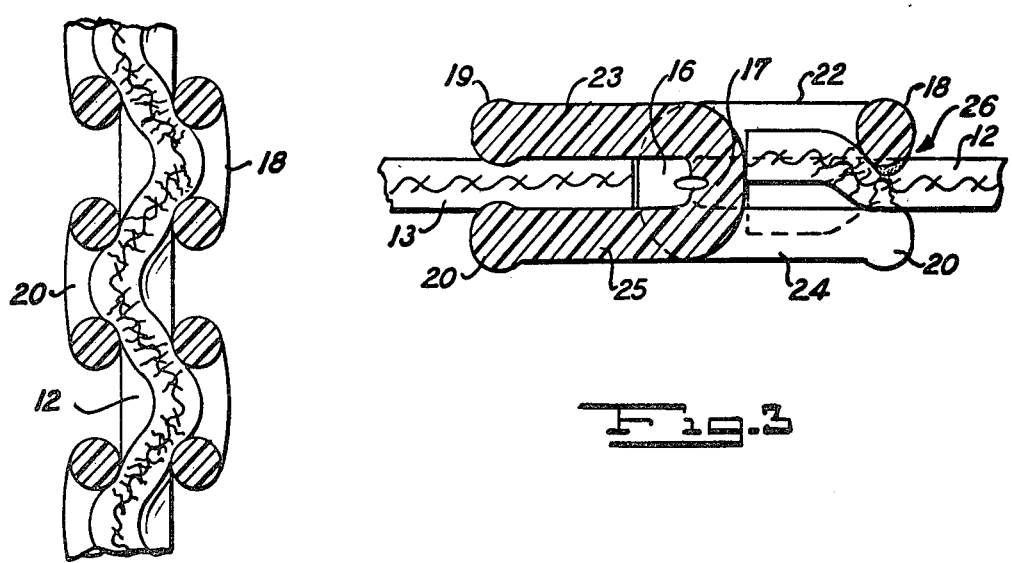
Fig.2
Fig.3

METHOD OF MANUFACTURING THREADLESS SLIDE FASTENER CHAINS

Cross Reference to Related Applications

This application is a division of my application Ser. No. 255,146 filed Feb. 10, 1972, now U.S. Pat. No. 3,885,274 continuation-in-part of my application Ser. No. 64,487 filed Aug. 17, 1970 which is now abandoned. Said application Ser. No. 255,146 is hereby incorporated by reference.

BACKGROUND OF THE INVENTION

1. Field of the Invention

The present invention pertains to slide fastener chains and more particularly to methods of manufacturing threadless slide fastener chains wherein the stringers are directly bonded with the carrier tapes.

2. Description of the Prior Art

Numerous slide fasteners utilize coupling elements of the type formed from a continuous length of filamentary material which has been deformed into a series of head elements interconnected to first and second sets of generally U-shaped heel members by a plurality of legs. Such a continuous filamentary stringer is commonly referred to as a ladder-type stringer and may be manufactured from any suitable plastic material which, after being formed, can be conveniently attached to a carrier tape.

Generally, in manufacturing a slide fastener incorporating this type of stringer, the stringer is disposed with the head elements aligned next to a longitudinal edge of a carrier tape with the plurality of legs and the first and second sets of heel members overlying respective opposite surfaces of the tape. The plurality of legs of the filamentary stringer are thereafter attached to the carrier tape by suitable stitching or braiding which typically passes through the carrier tapes and around the exposed outer surface of each of the legs to securely affix the stringer to the tape in such a position that the protruding head elements from a pair of filamentary stringers may be easily interengaged for effectively joining a pair of carrier tapes. The resulting interengaged article, which is commonly referred to as slide fastener chain, is then processed through a series of subsequent operations to produce individual finished slide fasteners of a given size or length.

Slide fasteners of the type just described have proven to be highly satisfactory under various conditions of use and as a result have received widespread commerical acceptance. However, in a number of applications such slide fasteners are exposed to considerable surface abrasion on both inner and outer surfaces thereof which has a tendency to sever, tear or otherwise damage the exposed stitching threads. As can be readily appreciated, abrasion of the stitching threads tends to free the stringers from the tapes which often results in misalignment of the interengagable head elements and can cause the slide fastener to jam or to undesirably open at the point of thread wear.

The prior art, as exemplified by U.S. Pat. No. 3,054,364, is generally cognizant of various techniques for attaching filamentary stringers to carrier tapes; however, a practical and effective threadless slide fastener chain has not heretofore been available.

SUMMARY OF THE INVENTION

Accordingly, it is an object of the present invention to provide a method of manufacturing slide fastener chain without using threads to secure the stringer to the tape thereby producing an improved threadless slide fastener chain.

The present invention has a further object to provide a method of securely attaching heel members of a filamentary stringer to a carrier tape without stitching threads or braiding thus producing a threadless slide fastener chain.

Another object of the present invention is to ultrasonically fuse the heel members of a filamentary stringer with a carrier tape to form a threadless slide fastener chain.

The present invention has an additional object in the construction of a threadless slide fastener chain wherein portions of a carrier tape are displaced into the interstices of a filamentary stringer and are rigidly bonded thereto to form a chain with improved wear characteristics.

A further object of this invention is to attach a filamentary stringer to a carrier tape by bonding superimposed filamentary stringer portions to each other through a carrier tape.

The present invention is generally characterized in that a method of forming a threadless slide fastener chain includes the steps of disposing a filamentary stringer having a plurality of head elements interconnected to a plurality of generally U-shaped upper and lower heel members by a plurality of legs, along a lateral edge of a carrier tape with said plurality of legs and said upper and lower heel members overlying respective opposite surfaces of said carrier tape with said tape edge being at least partially displaced into the interstices of said filamentary stringer, and threadlessly bonding each of said upper and lower heel members to said carrier tape thereby firmly attaching said filamentary stringer to said carrier tape.

Some advantages of the present invention reside in its simplicity of construction, economy of manufacture and ability to withstand considerable surface abrasion without being damaged.

Other objects and advantages of the present invention will become apparent from the following description of the preferred embodiments taken in conjunction with the accompanying drawings.

BRIEF DESCRIPTION OF THE DRAWINGS

FIG. 1 is a partial plan view of an embodiment of a threadless slide fastener chain according to the present invention;

FIG. 2 is a partial sectional view taken on line 2–2 of FIG. 1;

FIG. 3 is a partial cross-section taken on line 3—3 of FIG. 1;

DESCRIPTION OF THE PREFERRED EMBODIMENTS

Figure 4:
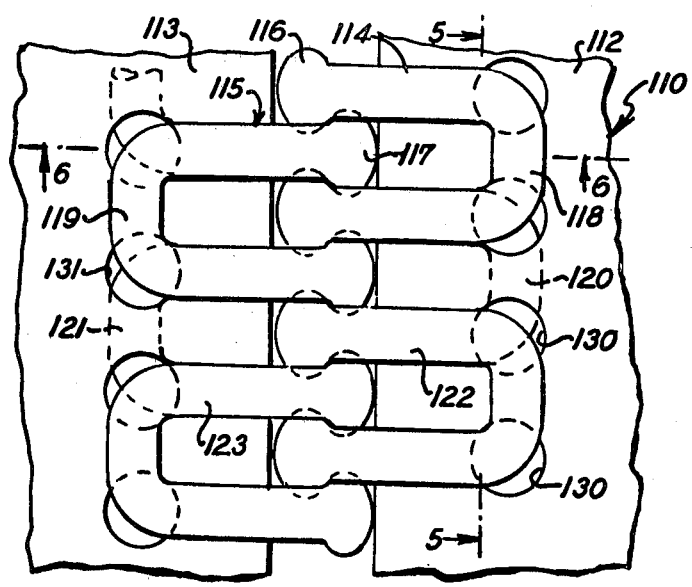
FIG. 4 is a partial plan view of a second embodiment of a threadless slide fastener chain according to the present invention.

Referring to FIGS. 1–3, a threadless slide fastener chain indicated generally at 10 and manufactured in accordance with the invention, has a pair of carrier tapes 12 and 13 upon which are disposed a respective one of a pair of filamentary stringers 14 and 15. The filamentary stringers 14 and 15 are substantially identical and are each preferably formed from a continuous length of plastic filamentary material which has been deformed into a series of head elements 16–17 interconnected to first and second sets of generally U-shaped heel members 18–19 and 20–21, respectively, by first and second sets of generally straight legs 22–23 and 24–25, respectively. The filamentary stringers 14 and 15 are each disposed along a longitudinal edge of one of carrier tapes 12 and 13 with the first and second sets of legs and the first and second sets of heel members over-lying respective opposite surfaces of the carrier tapes as illustrated in FIGS. 2 and 3. The stringers thus straddle the edge of the carrier tapes with the head elements 16 and 17 aligned in parallel relationship with such edge whereupon they may be easily interengaged as shown in FIG. 1.

The carrier tapes 12 and 13 are generally flat except at their inner longitudinal edges where they are each displaced upwardly and downwardly at spaced points along the edge to conform to the interstices defined by each of the U-shaped upper and lower heel members 18–19 and 20–21, respectively, and the straight legs 22–23 and 24–25. The edge of the carrier tape is thus convoluted as can be visualized in FIG. 2 with each displaced portion of the tape forming an arcuate raised surface conforming precisely to the interstitial dimensions of the legs and heel members of the stringers.

It should be understood that the carrier tapes may take any number of forms depending upon the particular contemplated application of the finished slide fasteners. For example, such tapes may be woven or sewn flat and subsequently deformed, either prior to assembly with the stringers or concurrent therewith, or may be woven to assume its distorted edge shape without requiring a subsequent displacing step. The tapes may also be of the nonwoven type wherein the various fibers used therein are bonded or fused together to form flat strips of material in accordance with any number of well known manufacturing techniques.

Each of the filamentary stringers are attached to the carrier tape in its displaced shape by directly bonding the generally U-shaped heel members of the stringer to the arcuate raised surface of the carrier tape with the fused portion 26 being diagrammatically illustrated in the drawings. It can be seen that by directly bonding the stringers with the carrier tape, the slide fastener chain requires no stitching threads and is thus capable of withstanding considerable surface abrasion which would otherwise sever or tear the stitching employed in conventional slide fastener chains.

Such bonding may be accomplished by any of a number of techniques including, for example, the use of adhesives, dielectric heating, irradiation or ultrasonic fusing. If ultrasonic fusing, for example, is employed to produce the bond, the filamentary stringers as well as the carrier tapes are preferably constructed so as to contain a suitable thermoplastic or fusible material. The ultrasonic energy is thereafter directed through the U-shaped heel members of the stringer and the carrier tape such that a bond of sufficient strength will be formed at the area of contact between the tape and the stringer to assure positive attachment therebetween. It is noted that the strength of such bond is enhanced by the convoluted or arcuately raised surface of the tape which provides a relatively large surface area of contact between the tape and the heel members of the stringer. Furthermore, the raised surfaces of the tapes become rigidized during bonding whereupon the vertically displaced interstitial portions of the carrier tape act as abutments which tend to prevent separation of the tape from the stringer when subjected to lateral disruptive forces.

As mentioned above, the carrier tapes may be of any suitable type such as a nonwoven material. Such nonwoven carrier tapes have an inherently high degree of elasticity which makes them especially well suited for use in the threadless slide fastener chain according to the present invention. This is primarily due to the fact that the elasticity of the nonwoven tape permits the tape to deform somewhat under the force of a point load applied to one of the head elements of the stringer; as a result, the point load is distributed to adjacent elements whereupon it can be absorbed without causing damage to the slide fastener chain.

Figure 5:
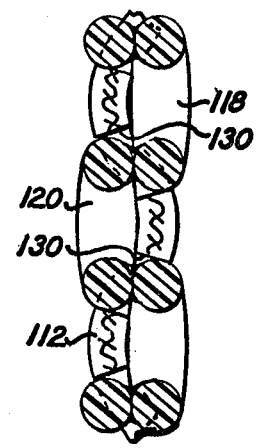
FIG. 5 is a partial sectional view taken on line 5—5 of FIG. 4.
Figure 6:
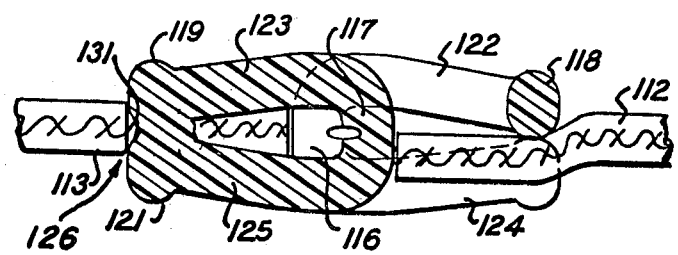
FIG. 6 is a partial cross-section taken on line 6—6 of FIG. 4.

Referring now to FIGS. 4–6, there is illustrated a second embodiment of a threadless slide fastener chain according to the present invention. The threadless slide fastener chain of FIGS. 4–6 is similar to that of FIGS. 1–3 and identical numerals with 100 added thereto will be used to describe correspondingly similar structure.

The threadless slide fastener chain 110 of FIGS. 4–6 has a pair of initially substantially flat carrier tapes 112 and 113 upon which are disposed a respective one of a pair of filamentary stringers 114 and 115. The filamentary stringers 114 and 115 are substantially identical and are each preferably formed from a continuous length of plastic filamentary material which has been deformed into a series of head elements 116–117 interconnected to first and second sets of generally U-shaped heel members 118–119 and 120–121, respectively, by first and second sets of generally straight legs 122–123 and 124–125, respectively. The filamentary stringers 114 and 115 are each disposed along a longitudinal edge of one of the carrier tapes 112 and 113 with the first and second sets of legs and the first and second sets of heel members overlying respective opposite surfaces of the carrier tapes as illustrated in FIGS. 5 and 6. The stringers thus straddle the edge of the carrier tapes with the head elements 116 and 117 aligned in parallel relationship with such edge whereupon they may be easily interengaged as shown in FIG. 4.

In the slide fastener chain illustrated in FIGS. 4–6, the carrier tapes 112 and 113 each define a set of spaced holes 130–131 therethrough which are aligned in parallel relationship with the longitudinal edge of the tape. Each of the holes are cut through the tape in such a position as to be interposed between an end of adjacent upper and lower heel members 118–119 and 120–121, respectively. The carrier tapes are initially not displaced or convoluted as in the preceeding embodiment but are generally flat throughout. The filamentary stringers are then placed on the tapes so as to straddle the perforated edge of the tape with the ends of th U-shaped heel members aligned with the holes. The heel members are thereafter held together with the ends of adjacent heel members in contact as illustrated in FIGS. 5 and 6 whereupon they are bonded together as by adhesives, ultrasonic fusing, etc., in a manner similar to that described with respect to the preceeding embodiment, with the fused portion 126 being diagrammatically illustrated in the drawings. In this manner, the ends of adjacent upper and lower heel members of the stringers are positively bonded or fused together such that the stringers are firmly attached to the carrier tapes without the use of stitching threads, braiding, or the like.

It should be noted that, as before, the particular carrier tape employed in the slide fastener chain of FIGS. 4–6 may be either woven or nonwoven and may or may not contain thermoplastic or other fibers depending upon the contemplated use of the finished slide fastener. The tapes are distorted, as in the previous embodiment, in order to provide a larger bonding surface between the stringers and tapes.

Thus, threadless slide fastener chains according to the present invention are simple in construction, are economical to manufacture, do not require the use of stitching threads, braiding, or the like, and effectively withstand a degree of surface abrasion which would otherwise produce undesired tearing of conventionally employed stitching threads and resultant premature failure thereof.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A method of forming a threadless slide fastener chain from a carrier tape and a filamentary stringer having a plurality of head elements connected to a plurality of heel members by a plurality of legs, said method comprising the steps of forming a plurality of raised interstitial portions on the carrier tape along one lateral edge thereof conforming to interstices defined by said heel members and legs of said filamentary stringer, disposing said filamentary stringer, along the one lateral edge of said carrier tape with said plurality of legs and heel members overlying said carrier tape and with said interstitial portions being at least partially displaced into the interstices of said filamentary stringer, and threadlessly bonding each of said heel members to said carrier tape and said interstitial portions thereby firmly attaching said filamentary stringer to said carrier tape.

2. The method according to claim 1 wherein said filamentary stringer comprises a thermoplastic material, and said step of bonding comprises ultrasonically fusing the ends of adjacent heel members together.

3. The method according to claim 1 wherein said carrier tape comprises a thermoplastic material and said heel members include upper and lower heel members, said step of disposing including laying the upper and lower heel members over respective opposite surfaces of the carrier tape, and said step of bonding comprises ultrasonically fusing the ends of adjacent upper and lower heel members together.

4. The method according to claim 1 wherein both said carrier tape and said filamentary stringer comprise thermoplastic material and said heel members include upper and lower heel members, said step of disposing including laying the upper and lower heel members over respectiive opposite surfaces of the carrier tape, and said step of bonding comprises ultrasonically fusing the ends of adjacent upper and lower heel members together.

5. A method of threadlessly forming a slide fastener from a carrier tape and a filamentary stringer which has a plurality of head elements interconnected to a plurality of generally U-shaped upper and lower heel members by a plurality of legs, the method comprising the steps of deforming a lateral edge of said carrier tape upwardly and downwardly at regularly spaced intervals to produce interstitial portions of said carrier tape conforming to interstices defined by each of said U-shaped upper and lower heel members, disposing the filamentary stringer along a lateral edge of the carrier tape with said plurality of legs and said upper and lower heel members overlying respective opposite surfaces of said carrier tape and with said interstitial portions at least partially displaced into the interstices of said filamentary stringer, and threadlessly bonding each of said upper and lower heel members to said carrier tape thereby firmly attaching said filamentary stringer to said carrier tape, said upper and lower heel members being rigidly bonded to the interstitial portions of said carrier tape.

6. The method according to claim 5 wherein said lateral edge of said carrier tape is deformed prior to disposition of said filamentary stringer on said tape.

7. The method according to claim 5 wherein said lateral edge of said carrier tape is deformed subsequent to disposition of said filamentary stringer on said tape.

8. A method of forming a threadless slide fastener chain comprising the steps of disposing a filamentary stringer, having a plurality of head elements interconnected to a plurality of generally U-shaped upper and lower heel members by a plurality of legs, along a lateral edge of a carrier tape with said plurality of legs and said upper and lower heel members overlying respective opposite surfaces of said carrier tape and with said tape edge being at least partially displaced into the interstices of said filamentary stringer, threadlessly bonding each of said upper and lower heel members to said carrier tape thereby firmly attaching said filamentary stringer to said carrier tape, said carrier tape including a plurality of regularly spaced holes therethrough longitudinally aligned in parallel relationship with said longitudinal edge of said carrier tape, said filamentary stringer being disposed on said tape with said holes interposed between adjacent upper and lower heel members, and said bonding step fusing said upper and lower heel members together through said holes.

* * * * *